United States Patent
Sriram et al.

(10) Patent No.: US 7,317,776 B2
(45) Date of Patent: Jan. 8, 2008

(54) EFFICIENT PSEUDO-NOISE SEQUENCE GENERATION FOR SPREAD SPECTRUM APPLICATIONS

(75) Inventors: Sundararajan Sriram, Plano, TX (US); Vijay Sundararajan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 757 days.

(21) Appl. No.: 10/417,374

(22) Filed: Apr. 16, 2003

(65) Prior Publication Data

US 2004/0015527 A1 Jan. 22, 2004

Related U.S. Application Data

(60) Provisional application No. 60/373,665, filed on Apr. 18, 2002.

(51) Int. Cl.
 *H04L 7/00* (2006.01)
(52) U.S. Cl. ............ 375/367; 375/130; 375/140; 375/150; 714/728; 714/781; 712/1; 708/252
(58) Field of Classification Search ........... 475/367; 714/781; 712/1; 708/252; 370/335
See application file for complete search history.

(56) References Cited

U.S. PATENT DOCUMENTS 5,228,054 A * 7/1993 Rueth et al. ............... 708/252
6,097,889 A * 8/2000 Tarrab et al. ............... 712/1
6,173,009 B1 * 1/2001 Gu ............................ 375/150
6,219,815 B1 * 4/2001 DesJardins et al. ........ 714/781
6,282,181 B1 * 8/2001 Stark et al. ................ 370/335
6,282,230 B1 8/2001 Brown et al.
2001/0003530 A1 6/2001 Sriram et al.

* cited by examiner

*Primary Examiner*—David C. Payne
*Assistant Examiner*—Adolf DSouza
(74) *Attorney, Agent, or Firm*—Robert D. Marshall, Jr.; W. James Brady; Frederick J. Telecky, Jr.

(57) ABSTRACT

The invention solves the problem of efficiently generating pseudo noise sequences with an arbitrary offset delay. Novel and improved architectures are used, based on the matrix-vector pseudo noise generators. A first embodiment of this invention includes a plurality of serially connected transition matrix multiplication circuits producing a plurality of output state matrices. A second embodiment of this invention combines a first stage having plurality of matrix multiplication circuits connected to a first multiplexer circuit which selects an state matrix or one of the matrix products with a serial chain of matrix generator circuits including second matrix multiplication circuit and a second multiplexer selecting either a first input or the output of the second matrix multiplication circuit.

2 Claims, 3 Drawing Sheets

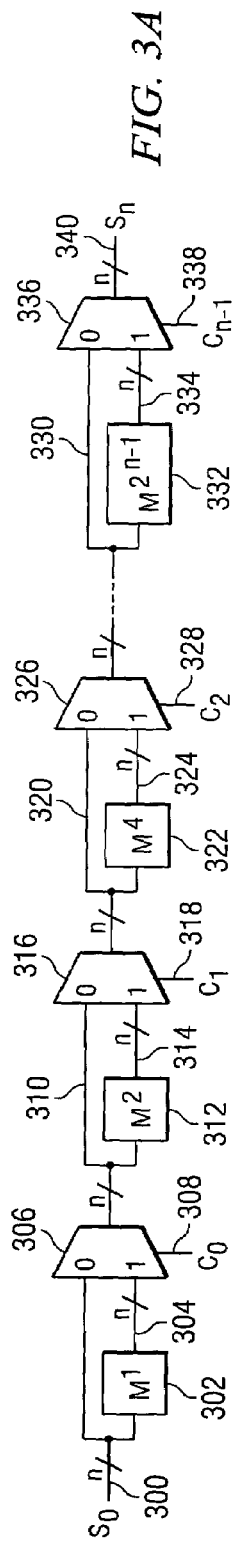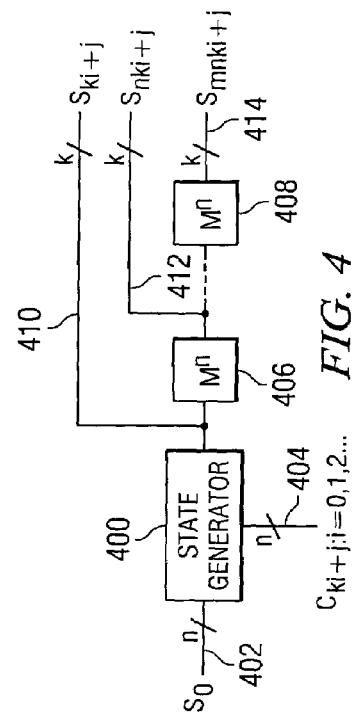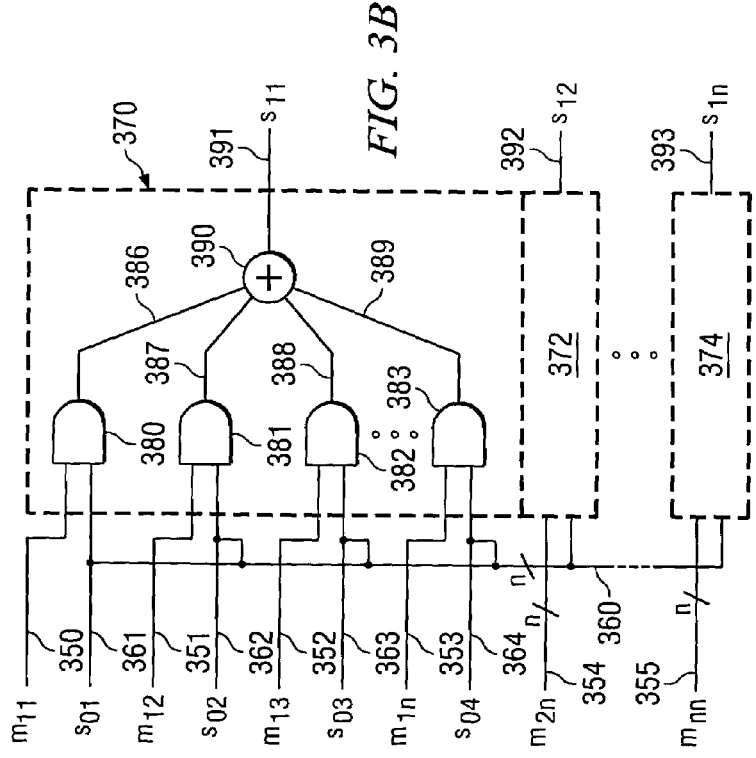
FIG. 3A
FIG. 3B
FIG. 4

EFFICIENT PSEUDO-NOISE SEQUENCE GENERATION FOR SPREAD SPECTRUM APPLICATIONS

CLAIM TO PRIORITY OF PROVISIONAL APPLICATION

This application claims priority under 35 U.S.C §119(e)(1) of provisional application No. 60/373,665, filed Apr. 18, 2002.

TECHNICAL FIELD OF INVENTION

This invention relates to the field of communications. More particularly, the invention relates to novel and improved pseudorandom noise generators for generating binary sequences with an arbitrary offset delay, where such sequences are periodic, but appear random within their period.

BACKGROUND OF THE INVENTION

Pseudo noise sequences or PN sequences have a wide range of applications including spread spectrum communications, cryptography, coding etc. One of the uses is in wideband code division multiple access (WCDMA) communication systems.

These PN sequences are commonly generated by Linear Feedback Shift Registers (LFSR), also known as a Linear Sequence Shift Register.

As shown on FIGS. 1 and 2, the LFSR includes an N-stage shift register, with some intervening exclusive-OR gates to program a specific PN sequence. The location of the exclusive-OR gates is determined by the defining polynomial of the circuit which in turn, determines which one of the possible sequences will be generated.

Present wideband code division multiple access (WCDMA) systems are characterized by simultaneous transmission of different data signals over a common channel by assigning each signal a unique code. This unique code is matched with a code of a selected receiver to determine the proper recipient of a data signal. Base stations in adjacent cells or transmit areas also have a unique pseudo-random noise (PN) code associated with transmitted data. This PN code or Long Code is typically generated by a Linear Feedback Shift Register (LFSR), and enables mobile stations within the cell to distinguish between intended signals and interference signals from other base stations. Identification of a PN code requires the mobile station to correctly identify an arbitrary part of the received PN sequence. The identification is frequently accomplished by a sliding window comparison of a locally generated PN sequence with the received part of the PN sequence. The sliding window algorithm often requires the mobile station to efficiently calculate multiple offsets from the LFSR to match the received sequence.

In another application of an LFSR, the base station typically generates a PN sequence for the forward link by a combination of one or more LFSRs 100, 120 as shown in FIG. 1. The mobile unit is also generates a PN sequence for the reverse link with LFSR circuits 200, 220 as shown in FIG. 2. This PN sequence is used for quadrature phase shift keyed (QPSK) reverse link transmission. This transmission requires that the PN sequence be arbitrarily shifted by the number of chips equivalent to 250 microseconds for transmitting the in-phase component and the quadrature component. This arbitrary shift may vary with data rate.

SUMMARY OF THE INVENTION

The invention described herein presents a number of novel architectures for efficient pseudo noise sequence generators, with a variable offset. Based on the matrix vector based PN generators, three architectures are part of the invention. These are the look ahead PN generator, a higher radix implementation of the matrix-vector architecture, and one implementing the PN generator with polynomial multiplication replacing the matrix-vector design.

BRIEF DESCRIPTION OF THE DRAWINGS

These and other aspects of this invention are illustrated in the drawings, in which

FIG. 3A is a block diagram of a PN generator circuit of the present invention;

FIG. 3B is a schematic diagram of an embodiment of a matrix multiplication circuit of FIG. 3A of the present invention;

FIG. 4 is a block diagram of a state generator circuit of the present invention for producing a plurality of state matrices separated by a predetermined offset;

DETAILED DESCRIPTION OF THE INVENTION

Figure 2:
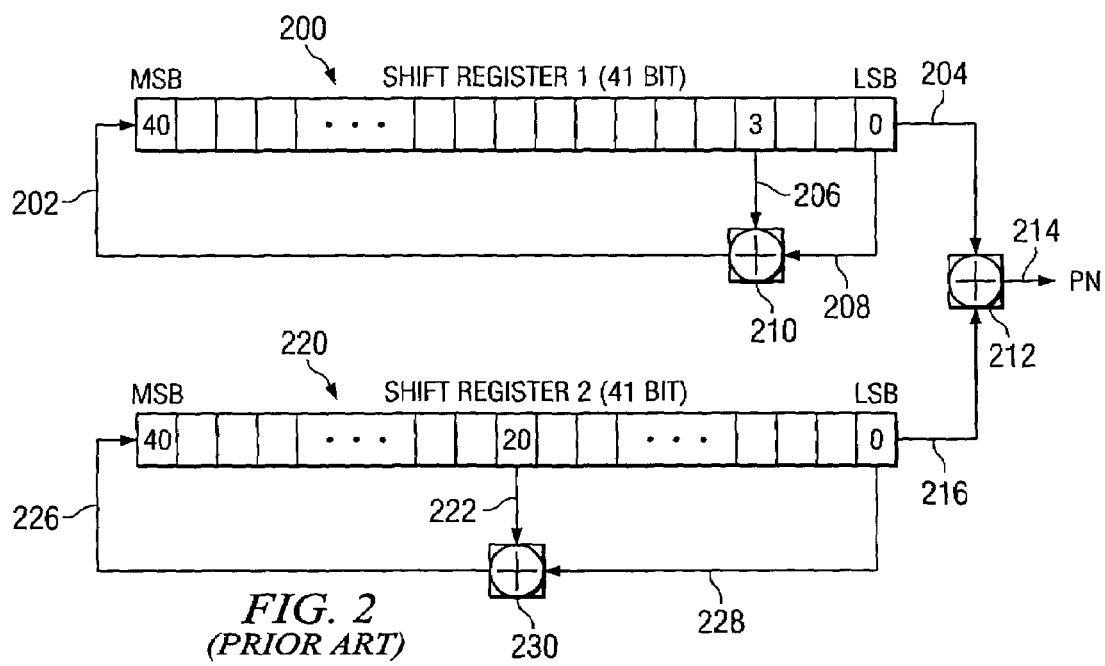
FIG. 2 is simplified block diagram of another linear feedback shift register of the prior art.

Referring to FIG. 3A, there is a block diagram of a PN generator circuit that may be used to generate an N-bit PN sequence corresponding to the LFSR 220 of FIG. 2. The N-stage PN generator circuit has $2^N-1$ or approximately $2.2 \times 10^{12}$ states. The PN generator circuit includes plural matrix generator circuits connected in series. The first matrix generator circuit receives an input state matrix $S_0$ on bus 300. The last matrix generator circuit in the series produces an output state matrix $S_n$ on bus 340. Each matrix generator circuit, for example the first matrix generator circuit, includes a matrix multiplication circuit 302 and a multiplex circuit 306. The matrix multiplication circuit is arranged to produce a matrix product of the respective input matrix and a respective stored matrix. The multiplex circuit produces one of the input state matrix and the matrix product in response to a respective count signal on lead 308.

In operation, the output state matrix $S_n$ on bus 340 of the PN generator circuit is a matrix multiplication product of the initial state matrix $S_0$ on bus 300 and a stored transition matrix. Alternatively, the stored transition matrix may be included in the matrix multiplication circuit as hard-wired combinatorial logic. This matrix multiplication is preferably a modulo-2 matrix multiplication for producing a state matrix or vector that is offset or delayed from the initial state matrix by the offset value. In general, this new state $S_n$ is determined by equation [1].

$$S_n = M^n S_0 \qquad [1]$$

The state matrix $S_n$ is offset or delayed from initial state matrix $S_0$ by n states of the PN sequence. The transition matrix $M^n$ is an initial transition matrix $M^1$ raised to the power n. This transition matrix has a form determined by the PN sequence polynomial as will be explained in detail. A maximum length of the offset value is determined by a practical length of the total PN sequence as will be described in detail. The concept of the present invention, however, may be extended to any N-bit offset value for a corresponding N-stage LFSR. The offset value c on leads 308, 318, 328 and 338 may be represented in binary form as shown in equation [2]

$$n = c_{n-1}2^{n-1} + c_{n-2}2^{n-2} + \ldots + c_1 2^1 + c_0 2^0 \quad [2]$$

A transition matrix for producing an arbitrary offset n from initial state $S_0$ is then represented by equation [3].

$$M^n = (M^{2^{n-1}})^{c_{n-1}} \times (M^{2^{n-2}})^{c_{n-1}} \times \ldots \times (M^{2^1})^{c_1} \times (M^{2^0})^{c_0} \quad [3]$$

Any transition matrix having an arbitrary n exponent, therefore, may be calculated by storing the matrices of equation [3] in memory circuits of matrix multiplication circuits 302, 312, 322 and 332. Any zero-value bit of the offset value, for example bit $c_0$ on lead 308, produces the input state matrix $S_0$ at the respective output bus 310. Alternatively, a one-value bit $c_0$ of the delay value on lead 308 applies the matrix product on bus 304 of the respective transition matrix and the input matrix to the respective output matrix bus 310. This selective matrix multiplication continues at each matrix generator stage in response to the value of each respective bit of the offset signal. The final state matrix $S_n$ at bus 340 may be any arbitrary offset with respect to the input state matrix $S_0$ in response to the offset value.

This circuit will efficiently produce a state vector having an arbitrary offset with respect to an initial state vector. Memory requirements are greatly reduced by storing only exponentially weighted matrices rather than the matrices for each desired offset. Moreover, computation time and power are minimized by use of combinatorial logic for modulo-2 matrix multiplication.

FIG. 3B is a matrix multiplication circuit of the present invention that may be used with the matrix generator circuits of FIG. 3A. The matrix multiplication circuit includes n logic circuits 370-374 corresponding to elements of the state vector $s_{11}$-$s_{1n}$. Each logic circuit, for example logic circuit 370, receives row elements $m_{11}$-$m_{1n}$ of a respective transition matrix and column elements $s_{01}$-$s_{0n}$ of a respective input state matrix. The matrix multiplication circuit includes first logic circuits 380-383 that perform a logical AND of corresponding row and column elements of the transition and state matrices. A second logic circuit 390 produces a logical exclusive-OR (XOR) of the multi-bit logical AND signal for each respective state matrix element $s_{11}$. The transition matrix may be stored in a memory circuit (not shown) as previously described, thereby providing programmability.

Figure 1:
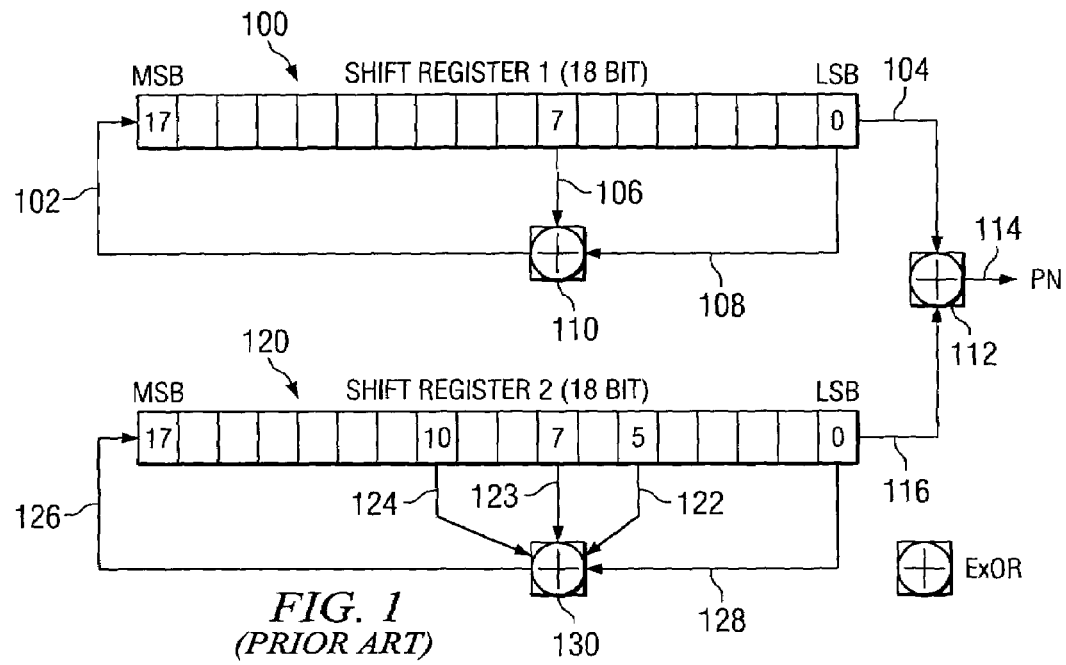
FIG. 1 is a simplified block diagram of a linear feedback shift register of the prior art.

Alternatively, each element of the state output matrix might be generated by Boolean minimization. For example, the 18-bit LFSR 100 of the prior art (FIG. 1) produces a PN polynomial as in equation [4] where offset value $c_7$ represents feedback tap 106.

$$G(x) = x^{18} + c_7 x^7 + 1 \quad [4]$$

An initial transition matrix $M^1$ for this PN polynomial has the form of equation [5]. The left column of the initial transition matrix includes zero elements $m_{0,0}$-$m_{17,0}$ and a one in element $m_{18,0}$. The I of equation [5] indicates a 17×17 square identity matrix having ones from the upper-left $m_{0,1}$ element along the diagonal to the lower-right $m_{17,18}$ element and zeros elsewhere. The 18-element vector c corresponds to coefficients of the PN polynomial of equation [4] in elements $m_{18,1}$-$m_{18,18}$. Only element $m_{18,7}$ corresponding to coefficient $c_7$, has a non-zero value.

$$M^1 = \begin{bmatrix} 0 & I \\ 1 & c \end{bmatrix} \quad [5]$$

Logic equations for each element of the matrix multiplication product of FIG. 3B have the general form of equation [6].

$$s_{(k+n),j} = \sum_i \sum_j r_{i,j} s_{k,j} \quad [6]$$

The predetermined form of the sparse transition matrix of equation [5], therefore, provides an efficient matrix multiplication circuit. A first element of the offset state vector for the PN polynomial of equation [4], for example, is simply column element $s_{01}$, since row element $m_{01}$ is the only non-zero element in the first row of the initial transition matrix. Other matrix products are also realized with minimal logic due to the relatively sparse characteristic of each transition matrix. Thus, transition matrix storage as a hardwired combinatorial logic circuit offers significant advantages in speed and simplicity and eliminates the need for programmable memory.

Turning now to FIG. 4, there is a block diagram of a state generator circuit of the present invention for producing a plurality of state matrices separated by a predetermined count or offset. The circuit includes a state matrix generator circuit as previously described in FIG. 3A. The state matrix generator circuit receives a state-input matrix $S_0$ on bus 402 and a count signal $c_{ki+j}$ on bus 404. The state matrix generator circuit produces-a k-bit state matrix $S_n$ on bus 410 that is delayed from the state input matrix $S_0$ by a number of states in the count signal. A plurality of m transition matrix multiplication circuits 406-408, similar to circuits 302, 312, 322 and 332 (FIG. 3A), are connected in series. Each matrix multiplication matrix circuit 406-408 includes a transition matrix multiplication circuit having a predetermined order n. Each matrix multiplication circuit 406-408 produces a respective state matrix delayed from a respective state input matrix by this predetermined order.

In operation, the count signal $c_{ki+j}$ on bus 404 is initialized at a desired offset j. This initial count signal produces m output state matrices at buses 410, 412 and 414. Each output state matrix is delayed from the respective input state matrix by the predetermined order n of the transition matrix $M^n$. Index i is incremented to produce a count signal that is incremented in multiples of k from the initial offset j, where k is less than n. Thus, a sequence of m sets of state matrices are produced in parallel, each set having a predetermined offset from an adjacent set according to the order of the transition matrix $M^n$. Each set of the sequence further includes a sequence of k-bit state matrices. This circuit is highly advantageous in producing multiple PN sequences for matching with a received signal. Minimal logic is required and parallel sets are generated in a single clock cycle.

It has been shown earlier that the logic delay incurred by a single matrix multiply could be as high as log(N) XOR gates and 1 AND gate. In order to circumvent this problem it is possible instead to limit the number of matrix multiplies and instead advance the initial state being fed to the PN generator. Instead of N stages of matrix-vector multiplication as in FIG. 3, L≦N stages are "collapsed" to generate $2^L$ initial states. L bits of the phase offset k can then be used to select one out of these $2^L$ initial states. The logic delay is then reduced by L log(N); the complexity however increases to $(2^L+N-L)N^2$.

Figure 5:
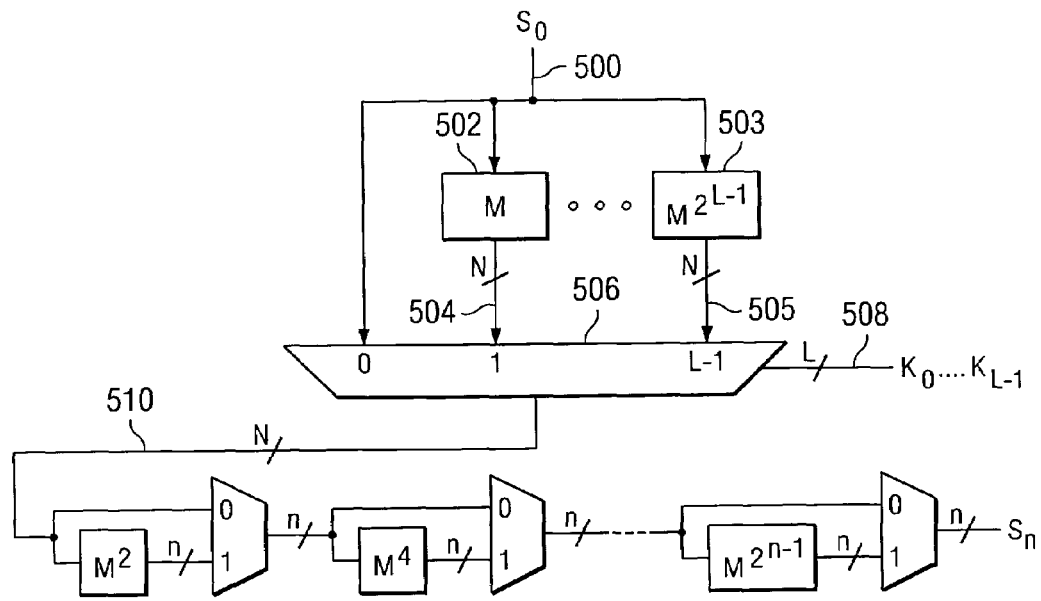
FIG. 5 is a block diagram of another embodiment of a PN generator circuit of the present invention.

The block diagram in FIG. 5 shows one embodiment of a PN generator of the present invention that demonstrates this approach. The PN generator circuit includes a series of matrix generator circuits including N stages having $2^N-1$ unique states. Each matrix generator unit, with the exception of the first stage 500-510 is similar to those previously described in detail in FIG. 3A, and function in a similar manner.

The first stage matrix generator circuit receives the input state matrix $S_0$ on bus 500. This bus is connected to multiplex circuit 506, and to multiple matrix multiplication circuits 502, 503 and others. Bus 508 replaces control line 308 in FIG. 3A to act as select control for the multiplex circuit 506. With the above exception, detailed operation of the generator is described with FIG. 3A.

The state of an LFSR, at time k, with generator polynomial, P(x) and initial state polynomial $S_0(x)$ can be represented as:

$$S_k(x) = (x^k S_0(x)) \bmod P(x)$$

As was shown with the matrix approach k can again be represented in binary form as:

$$k = 2^{(0)}.k_0 + 2^{(1)}.k_1 + 2^{(2)}.k_2 + \ldots + 2^{(N-2)}.k_{N-2} + 2^{(N-1)}.k_{N-1}; \quad 0 \leq k \leq 2^N-1$$

Additionally since the polynomial field has a cardinality of $2^N$ we have:

$$x^{2^N} = (1) \bmod P(x)$$

Hence, as an alternative to the matrix approach one may implement the state update of the LFSR as:

$$S_k(x) = (x^{2^{(0)}k_0} x^{2^{(1)}k_1} x^{2^{(2)}k_2} \ldots x^{2^{(N-2)}k_{N-2}} x^{2^{(N-1)}k_{N-1}}) S_0(x)) \bmod P(x)$$

Denoting $<x,m> = x^{2^m} \bmod P(x)$ shows that if we pre-compute and store the polynomials, $<x, 0>$, $<x, 1>$, $<x, 2>$, ..., $<x, N-2>$, $<x, N-1>$ then the state update can be computed using polynomial instead of matrix multiplication. The number of polynomial multiplications required is upper bounded by N+1 and by using a tree-structured multiplication algorithm the latency of this architecture is bounded by ceil(log (N+1)) polynomial multiplications. This contrasts with a worst case latency of N matrix multiplications in the traditional serial matrix based approach.

The block diagram in FIG. 5 shows one embodiment of a PN generator of the present invention that demonstrates this approach. The PN generator circuit includes a series of matrix generator circuits including N stages having $2^N-1$ unique states. Each matrix generator unit is similar to those previously described in detail with FIG. 3A, with the exception that a polynomial multiplier is substituted for the matrix multipliers, and function in a similar manner. The base of the polynomial used may be hard wired, or stored in an alterable memory.

Figure 6:
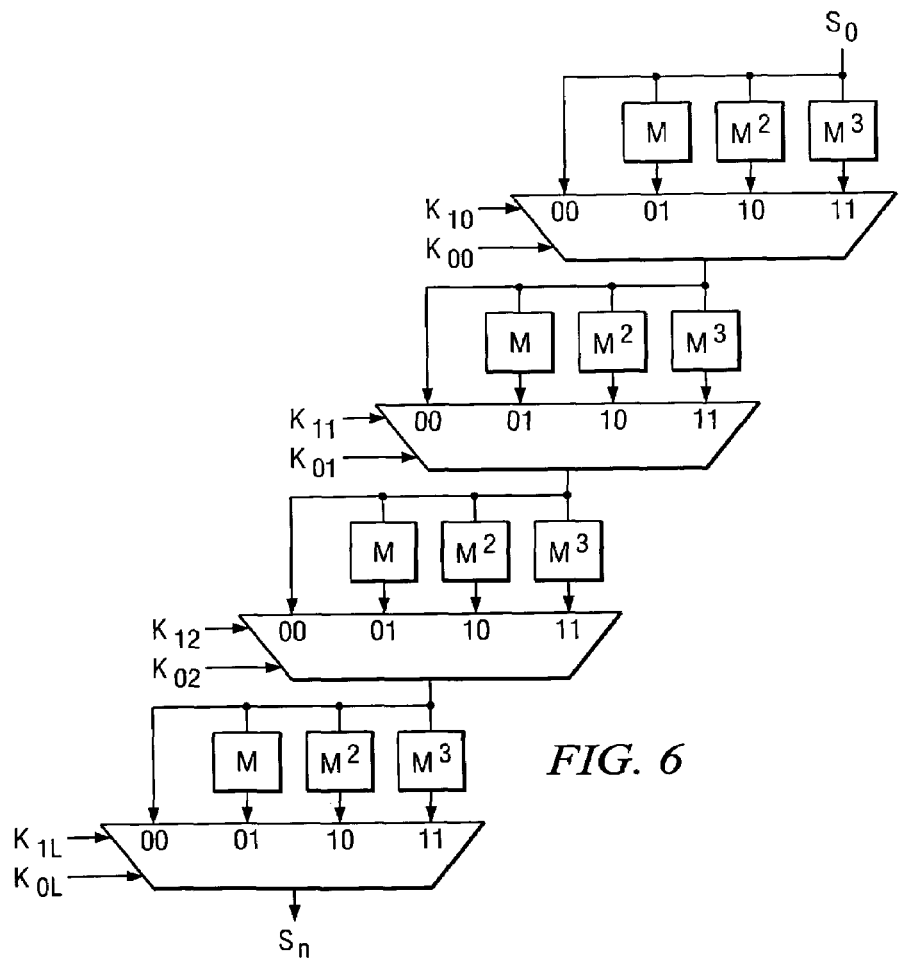
FIG. 6 is a block diagram of another embodiment of a PN generator circuit of the present invention.

FIG. 6 shows another embodiment of a PN generator of the present invention that may be used where a minimum delay is desired. By the use of higher radix representations, the delay is reduced at the expense of circuit area. For a radix 4 implementation, the offset k is given by the following equation:

$$k = (k_{00} + 2k_{10})4^{(0)} + (k_{01} + 2k_{11})4^{(1)} + \ldots + (k_{0L} + k_{1L})4^{(L)},$$
$$k_{ij} \in (0,1); \quad 0 \leq k \leq 2^N-1 \qquad (9)$$

As FIG. 6 shows, the overall structure is again very similar to the embodiment shown on FIG. 3A. There are a plurality of matrix generator circuits, each consisting of multiple matrix multipliers circuits, and a multiplex circuit. In the case of Radix 4 shown on FIG. 6, there are 3 multiplier circuits in each matrix generator circuit. This is given as an example only, as the number of multipliers is selected as a trade off between reduced delay and increased circuit area. With the exception of having multiple multiplier circuits in each matrix generator, the operation is identical to the embodiment described in detail with FIG. 3A.

Although the invention has been described in detail with reference to its preferred embodiments, it is to be understood that this description is by way of example only and is not to be construed in a limiting sense. Furthermore, any of the previously described embodiments may be implemented in software by a digital processor as will be appreciated by those ordinarily skilled in the art.

It is to be further understood that the inventive concepts of the present invention may be embodied in a mobile communication system as well as circuits within the mobile communication system. Moreover, numerous changes in the details of the embodiments of the invention will be apparent to persons of ordinary skill in the art having reference to this description. It is contemplated that such changes and additional embodiments are within the spirit and true scope of the invention as claimed below.

What is claimed is:

1. A pseudo noise generator comprising:
a state matrix generator receiving a multi-bit state input matrix and a count signal and generating a multi-bit state matrix output;
a plurality of serially connected transition matrix multiplication circuits of predetermined order n each having a first input receiving a matrix input, a second input receiving a corresponding stored matrix and an output producing a matrix product of said matrix input and said stored matrix, said first input of a first transition multiplication circuit receiving said multi-bit state matrix output of said state matrix generator and said first input of other transition multiplication circuits connected to said output of a prior transition matrix multiplication in said serial connection, thereby producing a plurality of output state matrices.

2. A pseudo noise generator comprising:
a plurality of first matrix multiplication circuits each having a first input receiving an input state matrix $S_0$, a second input receiving a corresponding stored matrix and an output producing a matrix product of said input state matrix $S_0$ and said stored matrix;
a first multiplexer circuit having a plurality of matrix inputs, a first matrix input receiving said input state matrix $S_0$ and each other matrix input connected to said output of a corresponding one of said first matrix multiplication circuits, a control input and an output, said first multiplexer circuit connecting one matrix input to said matrix output corresponding to a control signal received at said control input; and
a plurality of serially connected matrix generator circuits having a matrix input and a matrix output, said matrix input of a first matrix generator circuit connected to said matrix output of said first multiplexer circuit and said matrix input of other matrix generator circuit connected to said matrix output of a prior matrix generator in said serial connection, each matrix generator circuit including:

a second matrix multiplication circuit having a first matrix input connected to said matrix input of said matrix generator circuit, a second matrix input receiving a corresponding stored matrix and an output producing a matrix product of said matrix input and said stored matrix, and a second multiplexer having a first input connected to said matrix input of said matrix generator circuit, a second input connected to said output of said corresponding second matrix multiplication circuit, a control input and an output connected to said matrix output of said matrix generating circuit, said second multiplexer connecting one matrix input to said matrix output corresponding to a control signal received at said control input.

* * * * *